United States Patent
Binetti et al.

(10) Patent No.: US 8,837,473 B2
(45) Date of Patent: Sep. 16, 2014

(54) SINGLE TIMESTAMP ENGINE FOR GENERATING TIMING INFORMATION FOR INCLUSION IN PACKETS COMPLYING WITH MULTIPLE NETWORKING PROTOCOLS

(75) Inventors: Stefano Binetti, Monza (IT); Sreenivas Makam, Bangalore (IN); Sandesh K. Rao, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 353 days.

(21) Appl. No.: 13/270,463

(22) Filed: Oct. 11, 2011

(65) Prior Publication Data
US 2013/0089090 A1    Apr. 11, 2013

(51) Int. Cl.
*H04W 4/00* (2009.01)
(52) U.S. Cl.
USPC .......................................................... 370/389
(58) Field of Classification Search
None
See application file for complete search history.

(56) References Cited

U.S. PATENT DOCUMENTS

2010/0040369 A1* 2/2010 Zhao et al. ..................... 398/58
2012/0278723 A1* 11/2012 Knaggs et al. ................ 715/738
2012/0281715 A1* 11/2012 Shojania et al. .............. 370/468

* cited by examiner

*Primary Examiner* — John Blanton
(74) *Attorney, Agent, or Firm* — Campbell Stephenson LLP

(57) ABSTRACT

Packets of various protocols may contain timestamps generated by a single timestamp engine. In one embodiment, packets of two different protocols, which are referred to as Protocols A and B for simplicity, contain timestamps generated by the same Protocol B timestamp engine. In order to cause a Protocol B timestamp engine to produce a timestamp for a Protocol A packet, information can be provided to the Protocol B timestamp engine indicating that the Protocol A packet is a packet of Protocol B. The information can be provided by an internal header appended to the Protocol A packet that effectively misidentifies the Protocol A packet as a Protocol B packet. As a result, the Protocol B timestamp engine generates and inserts a timestamp for the Protocol A packet as if it were a Protocol B packet. The Protocol A packet, now including the timestamp, can be output or further processed.

17 Claims, 6 Drawing Sheets

SINGLE TIMESTAMP ENGINE FOR GENERATING TIMING INFORMATION FOR INCLUSION IN PACKETS COMPLYING WITH MULTIPLE NETWORKING PROTOCOLS

FIELD OF THE INVENTION

This invention relates generally to networking, and, more particularly, to networking protocols that include timing information.

BACKGROUND OF THE INVENTION

Network protocols enable network devices to communicate with each other across a network. A protocol defines the functionality (as opposed to the underlying implementation of that functionality) of a communication scheme, including features such as the format of protocol packet(s), scheme(s) in which the protocol packet can be used, and how protocol packet(s) may be sent across the network. Various protocols may be implemented on network devices in the network. For example, a network device may implement certain protocols for monitoring performance of the network and for synchronizing clocks of network devices across the network, while implementing other protocols in order to communicate user data across the network.

Many of these protocols require a timestamp engine to provide timestamps for the protocol packets. A timestamp can indicate a time at which an event occurred, such as the time when a protocol packet is transmitted by a network device or received from another network device. Network devices typically implement dedicated timestamp engines for each protocol that requires a timestamp.

BRIEF DESCRIPTION OF THE DRAWINGS

The present invention may be better understood, and its numerous objects, features and advantages made apparent to those skilled in the art by referencing the accompanying drawings.

Figure 1:
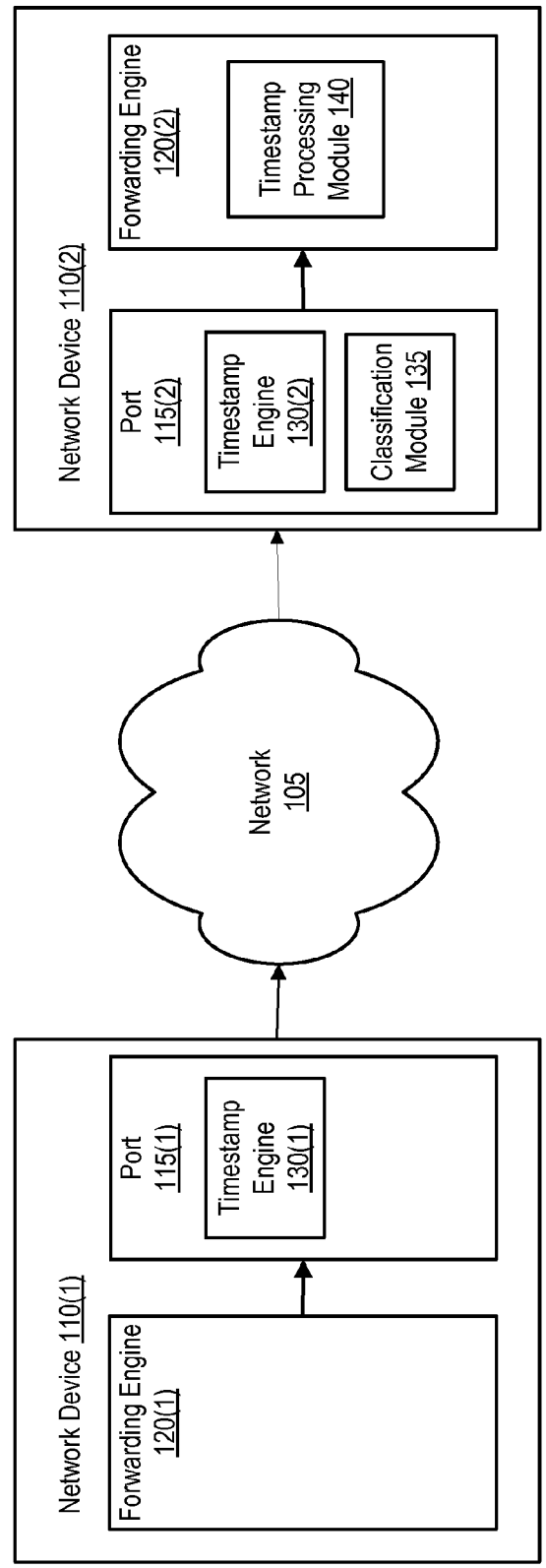
FIG. 1 is a block diagram of a network that includes a transmitting network device and a receiving network device, according to one embodiment.

While the present invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the present invention as defined by the appended claims.

DETAILED DESCRIPTION

Overview

A single timestamp engine within a network device can generate timing information (e.g., such as timestamps, sequence numbers, or the like) for multiple different networking protocols. For example, the same timestamp engine, which may have been originally designed to implement a first protocol, can generate timestamps for inclusion in both packets that comply with the first protocol and packets that comply with a second protocol. Accordingly, a timestamp engine designed to implement a first protocol may be used in place of a timestamp engine implementing a second protocol. Since timestamp engines are typically implemented in hardware (e.g., in application-specific integrated circuits (ASICs)), this can reduce the amount of hardware required for a network device to support multiple different protocols. In other words, instead of requiring dedicated timestamp engines for each protocol supported by a network device, as few as one timestamp engine may be required to timestamp a plurality of packets that comply with a plurality of protocols, which may eliminate redundancy and free up resources on the network device. Use of a particular timestamp engine may also improve timestamp accuracy. For example, one protocol may require more accurate timestamps than are required by certain other protocols. If a timestamp engine implementing this protocol is used to generate timestamps for packets complying with another, less rigorous protocol, those packets will have more accurate timestamps than they might otherwise have (e.g., if instead their timestamps were generated by a timestamp engine designed only to implement the less rigorous protocol).

In one embodiment, packets of two different protocols, referred to as Protocol A and Protocol B for simplicity, contain timestamps generated by the same timestamp engine. For example, a packet that complies with Protocol A (referred to as a Protocol A packet) may contain a timestamp generated by a timestamp engine that is designed to implement Protocol B (referred to as a Protocol B timestamp engine). In order to cause the Protocol B timestamp engine to produce a timestamp for a Protocol A packet, the network device provides information to the Protocol B timestamp engine indicating that the Protocol A packet is a packet of Protocol B. As a result, the Protocol B timestamp engine (instead of the Protocol A timestamp engine, if any, within the network device) then generates and inserts a timestamp for the Protocol A packet just as if it were a Protocol B packet. The Protocol A packet, which now includes the timestamp generated by the Protocol B timestamp engine, can then be output or further processed. In one embodiment, Protocol A can be a clock synchronization protocol, such as Precision Time Protocol (PTP) defined by IEEE 1588, and Protocol B can be an operations, administration, and management protocol such as Bidirectional Forwarding Detection (BFD), Y.1731 Performance Monitoring (PM), or the like.

Various techniques can be used to cause a timestamp engine designed to implement one protocol to generate timestamps for packets of different protocol(s). In one embodiment, the Protocol A packet can be represented as a packet of Protocol B through use of an internal header. Generally, a network device appends an internal header to each packet received by the network device in order to properly convey the packet within the network device. This internal header can identify packets that need special processing and cause each packet to be processed by the appropriate components within the network device. These internal headers can be generated by an input port and/or processor (e.g., such as a forwarding engine, routing engine and/or general purpose processor), modified by various internal components within the network device, and removed by an output port before being output from the network device. As such, in order to cause a Protocol A packet to be processed by a Protocol B timestamp engine, the Protocol A packet can be encapsulated with an internal header that indicates that the protocol A packet is actually a protocol B packet. Effectively, the network device misidentifies the Protocol A packet as a Protocol B packet. In response to the internal header identifying Protocol B, the protocol B timestamp engine processes the Protocol A packet, generating a timestamp for the packet and inserting the timestamp into the packet, just as it would for a true Protocol B packet. The internal header is removed from the packet before the packet is output from the network device.

Example Embodiments

FIG. 1 is a block diagram of a network that includes a transmitting network device 110(1) and a receiving network device 110(2). While network device 110(1) is referred to as a transmitting network device and network device 110(2) is referred to as a receiving network device, network device 110(1) and network device 110(2) may each have the capability to both transmit and receive protocol packets.

Network device 110(1) includes a port 115(1) and a forwarding engine 120(1). Port 115(1) includes a timestamp engine 130(1). Network device 110(2) includes a port 115(2) and a forwarding engine 120(2). Port 115(2) includes a timestamp engine 130(2) and a classification module 135. Forwarding engine 120(2) includes a timestamp processing module 140. In another embodiment, forwarding engine 120(1) of network device 110(1) may also include another timestamp processing module 140 to process protocol packets received by network device 110(1). Similarly, port 115(1) of network device 110(1) may also include another classification module 135 to classify protocol packets received by network device 110(1).

Ports 115(1) and 115(2) are each configured to send and/or receive packets via a network. In one embodiment, each port is implemented using one or more application-specific integrated circuits (ASICs), which can in turn be implemented on a line card. Timestamp engines 130(1) and 130(2) are specialized modules within each port that are configured to generate timing information in a manner that complies with a particular protocol (e.g., such as a clock synchronization protocol such as PTP) and to insert that timing information into packets being set from and/or received via the port in which the timestamp engines are respectively included.

Forwarding engines 120(1) and 120(2) are configured to perform various functions relating to forwarding packets through their respective network devices. Forwarding engines 120(1) and 120(2) can implement one or more Layer 2 (L2) protocols that allow packets to be conveyed from one network device to another. In some embodiments, there are multiple forwarding engines (e.g., one per line card) within each network device; in other embodiments (such as the simplified example of FIG. 1), each network device includes only one forwarding engine. Forwarding engines 120(1) and 120(2) can be implemented in hardware or a combination of hardware and software.

Network devices 110(1) and 110(2) are communicatively coupled (i.e., coupled to communicate with each other, either directly or indirectly) via network 105, which may be a provider network. As shown in FIG. 1, network devices 110(1) and 110(2) may be located at the edge of network 105. In one embodiment, network devices 110(1) and 110(2) may be located within network 105 as core network devices.

A protocol packet, which for purposes of this example is described as complying with Protocol A, is received at forwarding engine 120(1) in transmitting network device 110(1) for transmission into the network 105. Protocol A may be, for example, an operations, administration, and management (OAM) protocol, a fault management protocol, a performance monitoring protocol, or the like. Such example protocols may be used by service providers to monitor and manage characteristics of a network like network 105.

The Protocol A packet may be received at network device 110(1) from another network device or, alternatively, may be generated by network device 110(1). When the packet is processed by forwarding engine 120(1), forwarding engine 120(1) can determine that the packet is a Protocol A packet and that Protocol A packets require timestamps. For example, the packet can include a header that identifies (e.g., in a type field) the particular protocol with which the packet complies, and the forwarding engine can use this header to determine which protocol the packet complies with. The forwarding engine may also maintain information for each protocol supported by network device 110(1), and this information can indicate whether a timestamp is required by each protocol.

In some protocols, all packets may require a timestamp. In other protocols, only certain types of packets require a timestamp. If the forwarding engine determines that the packet requires a timestamp, the forwarding engine also determines whether the packet's native (i.e., complying with the same protocol as the packet) timestamp engine (if any) can generate an appropriate timestamp. If not, the forwarding engine determines that the packet should be processed by a non-native (i.e., complying with a different protocol than the packet) timestamp engine. In that situation, forwarding engine 120(1) can append an internal header to the packet and modify the internal header to identify the non-native protocol, such that the packet will subsequently be processed by the timestamp engine that complies with the non-native protocol.

Packets that comply with different protocols can be formatted differently, and thus the location of the timestamp field of a packet that complies with one protocol may differ from the location of the timestamp field of packets that comply with other protocols. To allow a timestamp engine configured to comply with one protocol to be able to properly insert timestamps into packets that comply with other protocols, forwarding engine 120(1) can also modify a field of the internal header that specifies the location of the timestamp within the packet and/or the packet's header, if needed. Thus, if Protocol A defines a different timestamp location than Protocol B, the timestamp location field of the internal header should identify the Protocol A timestamp location for an encapsulated Protocol A packet, even though the protocol type field of the internal header identifies Protocol B.

In response to the protocol A packet being represented as a protocol B packet through the use of the internal header generated by the forwarding engine, timestamp engine 130(1), which complies with Protocol B, identifies the Protocol A packet as a Protocol B packet and generates a timestamp for the Protocol A packet just as it would for a Protocol B packet. Timestamp engine 130(1) then uses the information in the internal header's timestamp location field to determine the location within the encapsulated Protocol A packet in which to insert the timestamp.

After the timestamp has been inserted into the Protocol A packet by timestamp engine 130(1), the internal header is removed and the Protocol A packet is output via port 115(1).

The Protocol A packet may then travel through network 105 to receiving network device 110(2).

It is noted that, in addition to generating timestamps for Protocol A packets that have been identified as Protocol B packets, the timestamp engine 130(1) can also generate timestamps for true Protocol B packets, as well as for packets complying with other protocols (e.g., such packets can also be identified as Protocol B packets using the internal header). Thus, timestamp engine 130(1), which complies with Protocol B, generates timestamps for both Protocol B packets and non-Protocol B packets.

The Protocol A packet, as well as various other packets of different protocols, can be received at network device 110(2) on port 115(2). In response to the receipt of the Protocol A packet via port 115(2), port 115(2) can append an internal header to the packet, and classification module 135 can detect whether the packet should be processed by timestamp engine 130(2), which, like timestamp engine 130(1), complies with Protocol B. The destination may be an internal destination on network device 110(2). The classification module 135 may be implemented in a port ASIC or alternatively in a ternary content addressable memory (TCAM). The classification module may also be implemented via an access control list (ACL).

If the received Protocol A packet should be processed by timestamp engine 130(2), classification module 135 can determine whether any modifications are needed to the packet's internal header in order to cause the packet to be processed by timestamp engine 130(2). If so, classification module 135 updates the internal header accordingly (e.g., to identify the packet as being a Protocol B packet and to indicate the appropriate location within the Protocol A packet to insert the Protocol B timestamp).

Once the Protocol A packet is represented as a Protocol B packet, the packet is sent to the Protocol B timestamp engine 130(2). In response to the Protocol A packet being represented as a Protocol B packet, the Protocol B timestamp engine 130(2) generates a timestamp and inserts the timestamp into the Protocol A packet (e.g., at the location identified in the internal header) just as it would for a Protocol B packet. After a timestamp has been inserted into the protocol A packet, the Protocol A packet includes two timestamps: one (generated by network device 110(1)) that indicates the time at which the Protocol A packet was sent from network device 110(1) and another (generated by network device 110(2)) that indicates the time at which the Protocol A packet was received by network device 110(2). It is noted that in some embodiments, both timestamps may not be necessary, and thus such embodiments may only generate one timestamp or the other, but not both.

The Protocol A packet is forwarded to a timestamp processing module 140. Timestamp processing module 140 is configured to process one or both of the timestamps included within the Protocol A packet. In one embodiment, this processing complies with Protocol A. In one embodiment, timestamp processing module 140 may calculate and/or monitor the delay of packets conveyed according to a certain protocol, based upon timestamps within the packets conveyed using that protocol. For example, an OAM protocol can measure the delay experienced by OAM protocol packets traveling across the network. A first OAM protocol packet may be timestamped on transmission from a first network device (e.g., transmitting network device 110(1)), and again on receipt at a second network device (e.g., receiving network device 110(2)). The two timestamps are used by the second network device, which processes the first OAM protocol packet to calculate delay and jitter between the first and second network devices in the network. The timestamp processing module 140 on the second network device may extract the two timestamps from the first OAM protocol packet in order to use the timestamps in such calculations. A second OAM protocol packet may also be sent in response back to the first network device, allowing the first network device to similarly process the protocol packets to calculate delay. Granularity of delay in the network may be increased by implementing the present disclosure in multiple core network devices, which may provide a more accurate depiction of delay in the network.

While the above description focuses on embodiments that use internal headers to drive packets of various protocol types to a particular timestamp engine, other embodiments may send all packets, regardless of the type indicated in the internal header, to the same timestamp engine. Still other embodiments may send all packets of certain types (e.g., protocols A and B) to the same timestamp engine. In these alternative embodiments, the timestamp engine may be configured to insert all timestamps at the same offset, regardless of the offset and/or protocol type specified in any internal headers appended to the packets into which the timestamps are being inserted.

Figure 2:
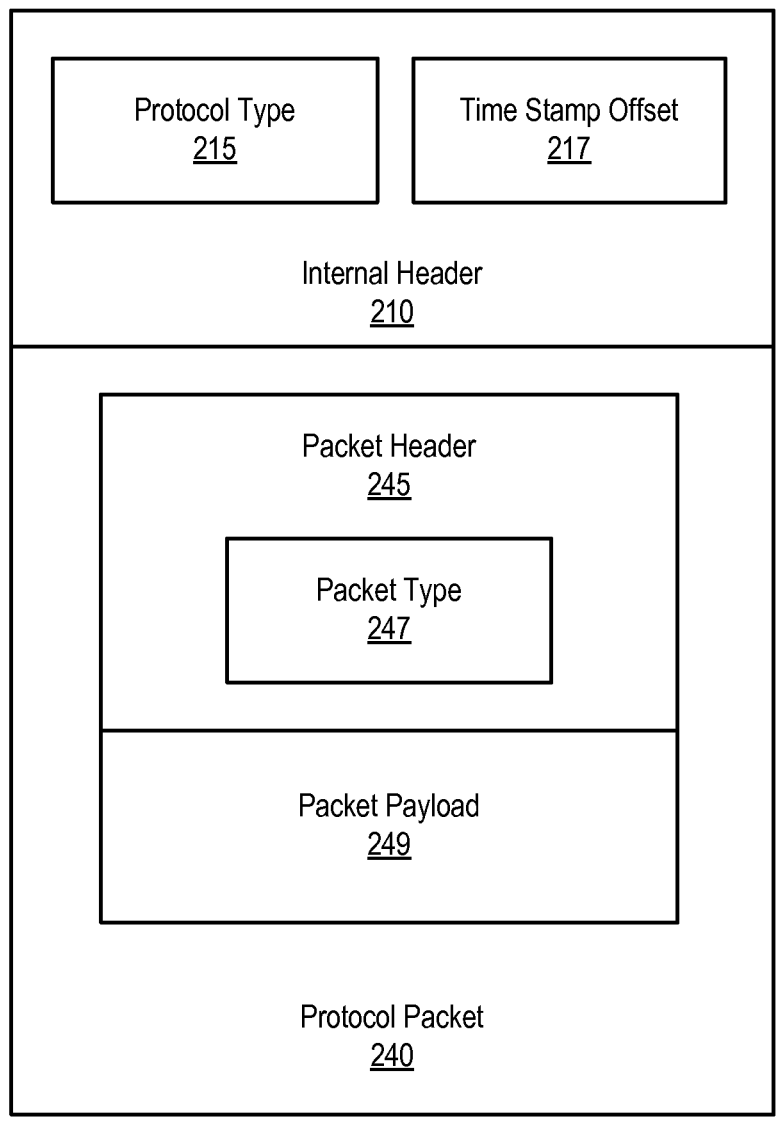
FIG. 2 is a block diagram of a protocol packet encapsulated in an internal header, according to one embodiment.

FIG. 2 illustrates an example of a protocol packet 240 encapsulated in an internal header 210. Protocol packet 240 includes a packet header 245 and a packet payload 249. The protocol packet 240 may be a protocol control packet (e.g., a packet used to convey information that controls the operation of the protocol) or a protocol data packet (e.g., a packet used to convey data via the protocol). Packet header 245 includes a packet type field 247 that identifies Protocol A, thus indicating that protocol packet 240 is a Protocol A packet.

Internal header 210 includes a protocol type field 215 and a timestamp offset field 217. Protocol type field 215 is used to identify the protocol of the protocol packet 240. By varying this value, a packet complying with one protocol can be represented as a packet of another protocol. For example, protocol packet 240 may be a Protocol A packet that needs to be processed by a Protocol B timestamp engine. Protocol type field 215 can be assigned a value that corresponds to, or identifies, Protocol B. Thus, protocol packet 240 can be encapsulated with internal header 210 that represents packet 240 as a Protocol B packet, if protocol type field 215 identifies Protocol B. It is noted that in such situations, the internal header 210 will identify a different protocol than is identified by the packet's header 245.

Timestamp offset field 217 identifies the location where the timestamp should be inserted into protocol packet 240. Thus, when protocol packet 240 is timestamped by a protocol B timestamp engine, the protocol B timestamp engine will insert a protocol B timestamp into protocol packet 240 at the location identified by timestamp offset 217. The timestamp offset field 217 identifies the location in a manner that complies with the packet's true structure. Accordingly, even though protocol type field 215 identifies Protocol A, timestamp offset field 217 can identify the location of the timestamp within the Protocol B packet structure.

Figure 3:
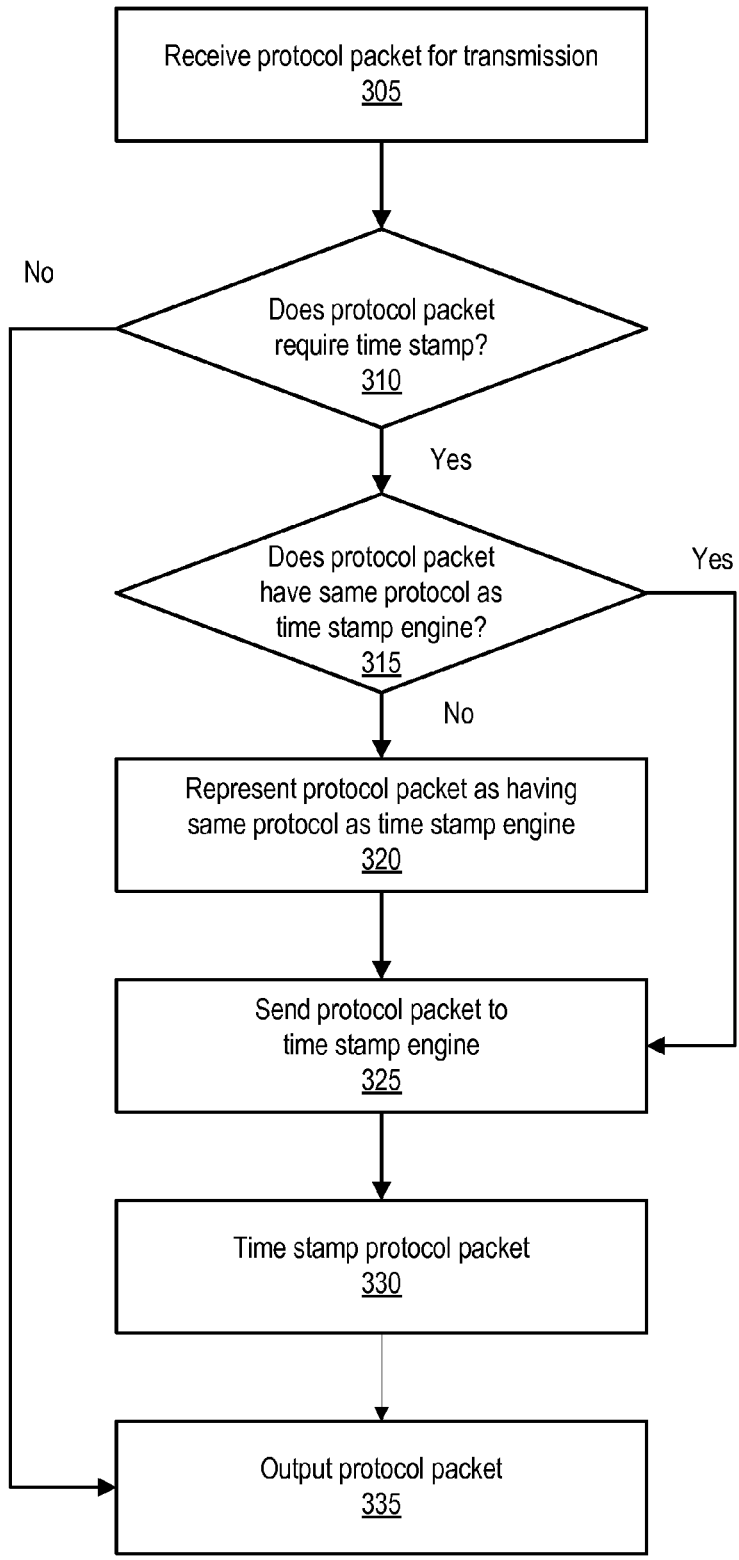
FIG. 3 is a flow chart of a process that can be implemented by a transmitting network device, according to one embodiment.

FIG. 3 illustrates a process that can be implemented by a transmitting network device. The process begins with operation 305, where a protocol packet is received. For this example, the protocol packet is a protocol A packet.

The process continues to operation 310, where the protocol packet is detected to require a timestamp. This detection can be based on the type of protocol with which the packet complies (Protocol A in this example), as well as other configuration. Operation 310 can be performed by a forwarding engine such as forwarding engine 120(1) or 120(2) of FIG. 1.

If the protocol packet does not require a timestamp, the process continues to operation 340, where the protocol packet is output on a port of the transmitting network device, and the process ends. If the protocol packet does require a timestamp, the process continues to operation 315, where a determination is made as to whether the protocol packet should be processed by a native or non-native timestamp engine. For example, protocol packet may be a Protocol A packet, but the network device processing the packet may be configured to generate timestamps for Protocol A packets using a Protocol B timestamp engine (e.g., due to not including a Protocol A timestamp engine or in order to increase the precision and/or accuracy of the timestamps included in Protocol A packets). If the protocols of the protocol packet and the timestamp engine are the same protocol, the process continues to operation 325, where the protocol packet is sent to the timestamp engine. If the protocols are different, as in our example of a Protocol A packet that includes a Protocol B timestamp, the process continues to operation 320, where the protocol packet is represented as having the same protocol as the timestamp engine. For example, the processing circuit may modify the protocol packet's internal header so that the internal header misidentifies the protocol packet as having the same protocol as the timestamp engine. The protocol packet is then sent to timestamp engine in operation 325.

From operation 325, the process continues to operation 330, where the protocol packet is timestamped by the timestamp engine. According to the different embodiments above, the protocol packet is timestamped by the timestamp engine in response to the protocol packet being represented as a packet having the same protocol as timestamp engine. The process continues to operation 335, where the protocol packet is output to the network on a port of the network device. If the protocol packet is encapsulated with the internal header, the internal header is removed from the protocol packet before the protocol packet is transmitted to the network.

Figure 4:
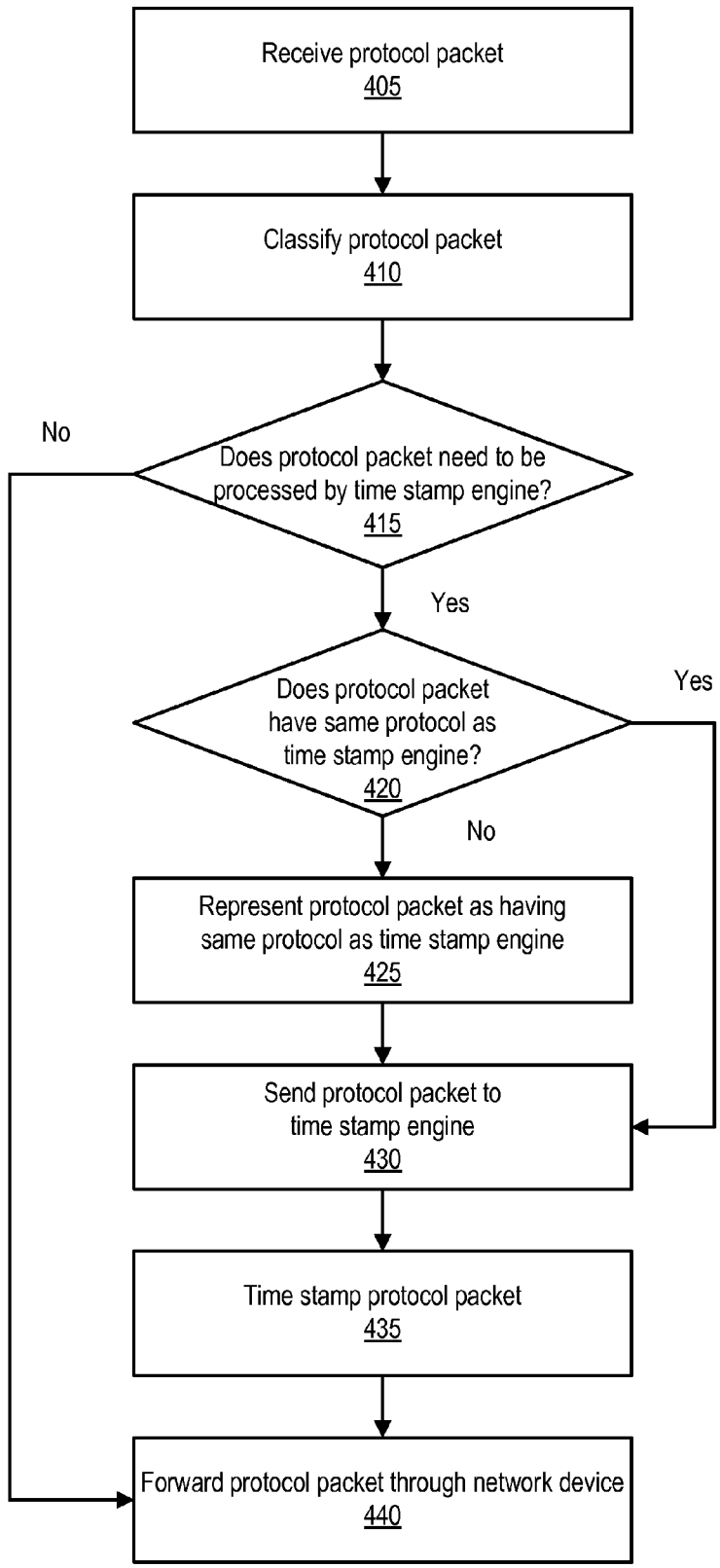
FIG. 4 is a flow chart of a process that can be implemented by a receiving network device, according to one embodiment.

FIG. 4 illustrates a process that can be implemented by a receiving network device. The process begins with operation 405, where a protocol packet is received from a transmitting network device. For this example, the protocol packet is a protocol A packet. The protocol packet can be received at a port of the receiving network device.

The process continues to operation 410, where a classification of the protocol packet is detected. This detection can be made by referring to the protocol packet's type (e.g., identifying the protocol with which the packet complies). The processing circuit may also refer to other aspects of the protocol packet format and the scheme defined by the protocol packet's protocol that may indicate classification of the protocol packet. The classification of the protocol packet indicates whether the packet should be processed by a timestamp engine.

Once the protocol packet is classified, the process continues to operation 415, where a determination as to whether the protocol packet should be processed by the timestamp engine is made, based upon the classification determined at 410. If the protocol packet is not destined for the timestamp engine, the process continues to operation 440, where the protocol packet is forwarded through the network device, and the process ends. If the protocol packet needs to be processed by the timestamp engine, the process continues to operation 420, where a determination is made as to whether the protocol packet complies with the same protocol as the timestamp engine on the receiving network device. For example, protocol packet may comply with Protocol A and the timestamp engine may comply with Protocol B.

If the protocols of the protocol packet and the timestamp engine are the same, the process continues to operation 430, where the protocol packet is sent to the timestamp engine. If the protocols are different, the process continues to operation 425, where the protocol packet is represented as having the same protocol as the timestamp engine. For example, the processing circuit may modify the protocol packet's internal header so that it misidentifies the protocol packet as having the same protocol as the timestamp engine. Like a protocol packet complying with the same protocol as the timestamp engine, the protocol packet is then sent to timestamp engine in operation 430.

From operation 430, the process continues to operation 435, where the protocol packet is timestamped by the timestamp engine. According to the different embodiments above, the protocol packet is timestamped by the timestamp engine in response to the protocol packet being represented as a packet having the same protocol as timestamp engine. The process continues to operation 440, where the protocol packet is forwarded through the network device.

Figure 5:
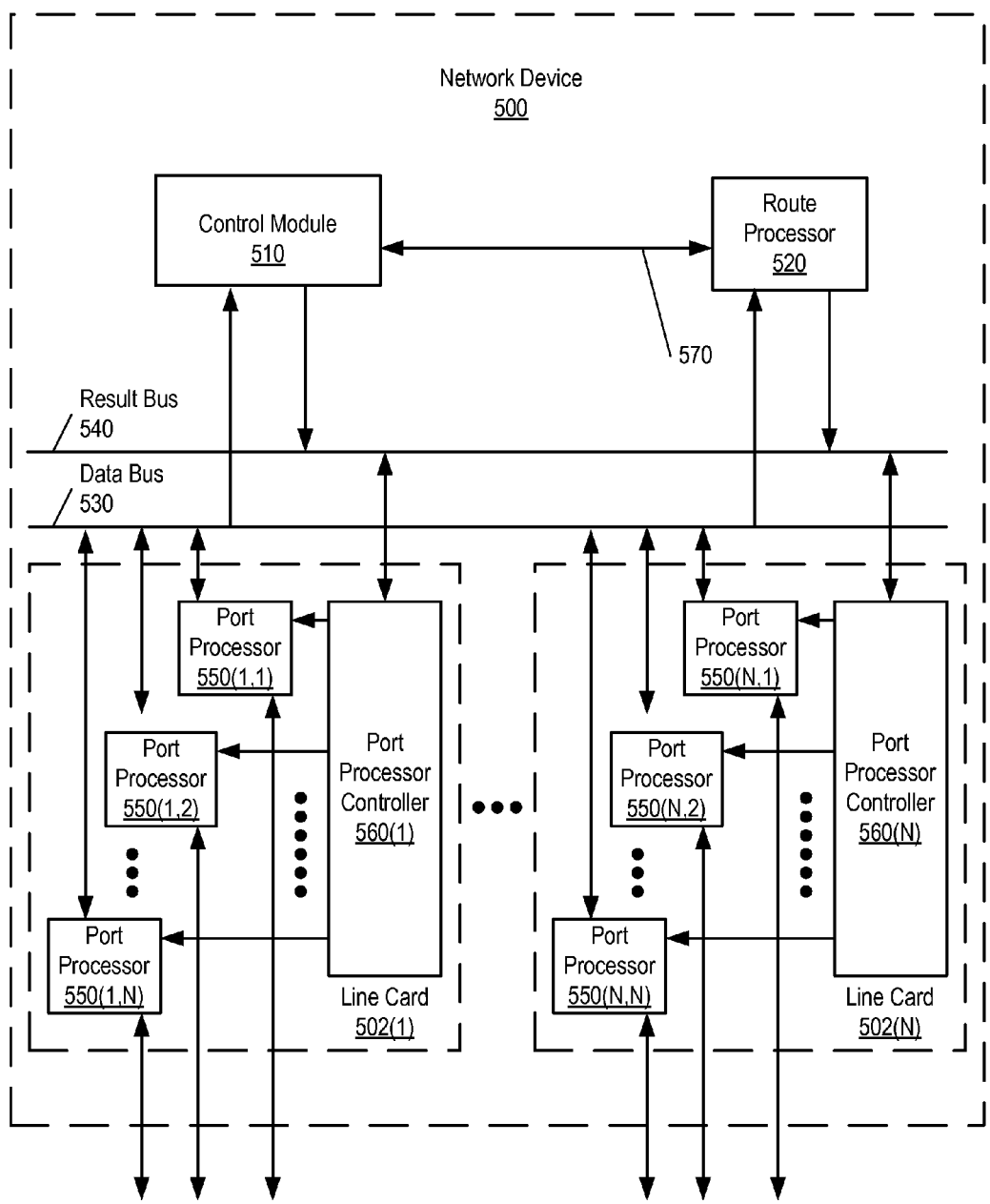
FIG. 5 is a block diagram of a network device, according to one embodiment.

FIG. 5 is a block diagram of a network device 500 (e.g., network device 110(1) and network device 110(2) of FIG. 1). In this depiction, network device 500 includes a number of line cards (line cards 502(1)-502(N)) that are communicatively coupled to a control module 510 (which can include a forwarding engine, not shown) and a route processor 500 via a data bus 530 and a result bus 540. Line cards 502(1)-(N) include a number of port processors 550(1,1)-550(N,N) which are controlled by port processor controllers 560(1)-560(N). It will also be noted that control module 510 and route processor 500 are not only coupled to one another via data bus 530 and result bus 540, but are also communicatively coupled to one another by a communications link 570. In alternative embodiments, each line card can include its own forwarding engine.

When a packet (e.g., protocol packet) is received, the packet is identified and analyzed by a network device such as network device 500 in the following manner. Upon receipt, a packet (or some or all of its control information) is sent from one of the port processors 550(1,1)-550(N,N) at which the packet was received to one or more of those devices coupled to data bus 530 (e.g., others of port processors 550(1,1)-550(N,N), a forwarding engine, and/or route processor 500). Handling of the packet can be determined, for example, by a forwarding engine. For example, a forwarding engine may determine that the packet should be forwarded to one or more of port processors 550(1,1)-550(N,N). This can be accomplished by indicating to corresponding one(s) of port processor controllers 560(1)-560(N) that the copy of the packet held in the given one(s) of port processors 550(1,1)-550(N,N) should be forwarded to the appropriate one of port processors 550(1,1)-550(N,N).

In this example, the processing circuits described with reference to FIGS. 3 and 4 (e.g., forwarding engines 120 and 180 and classification modules 135 and 165) may be implemented in one of port processors 550(1,1)-550(N,N), port processor controllers 560(1)-560(N), other ASICs (Application Specific Integrated Circuits) on line cards 502(1)-502(N) (not shown), and other ASICs on network device 500 (not shown). Timestamp engines like timestamp engines 130(1) and 130(2) of FIG. 1 may be implemented in one of port processors 550(1,1)-550(N,N) and other ASICs (Application Specific Integrated Circuits) on line cards 502(1)-502(N) (not shown).

Figure 6:
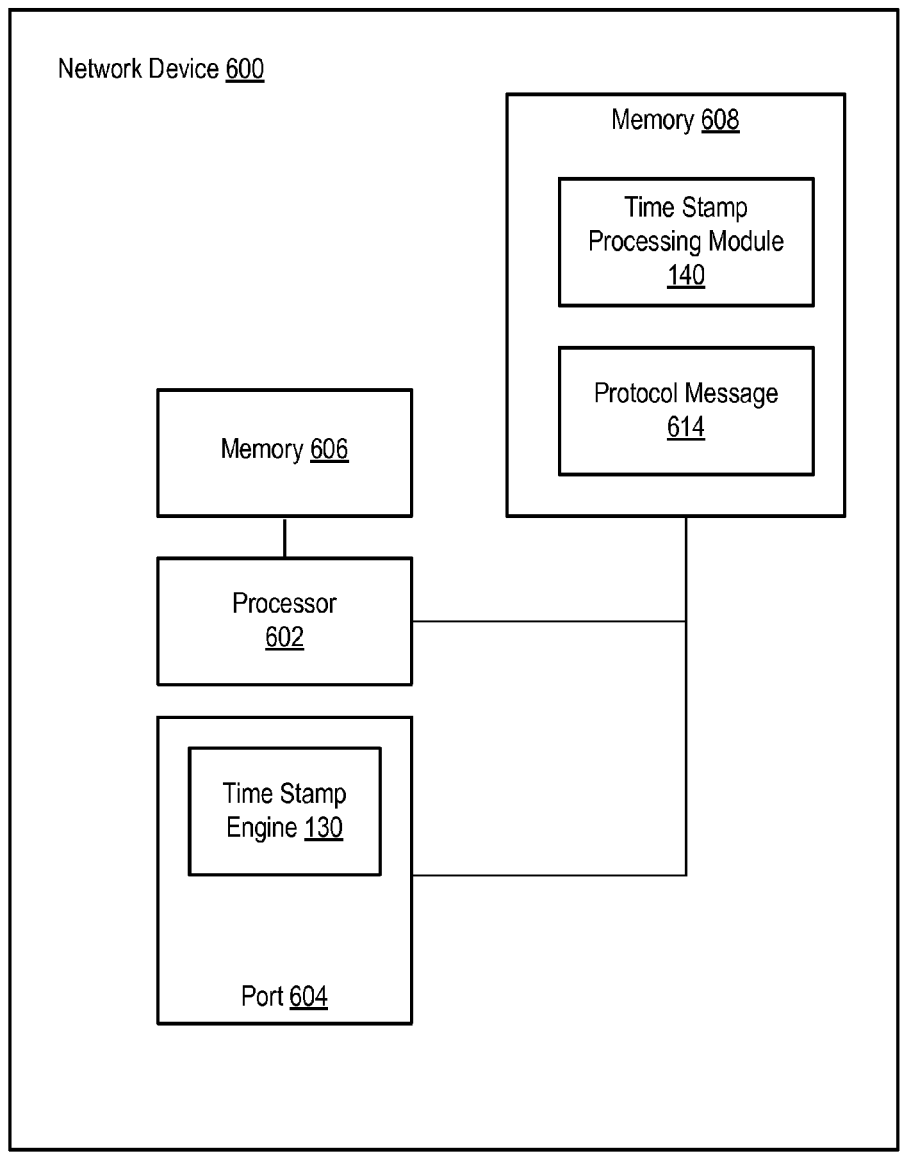
FIG. 6 is another block diagram of a network device, according to one embodiment.

FIG. 6 is a block diagram of a network device 600 (e.g., network device 110(1) and network device 110(2) of FIG. 1). As illustrated, network device 600 includes one or more processors 602 (e.g., microprocessors, PLDs (Programmable Logic Devices), or ASICs (Application Specific Integrated Circuits)) configured to execute program instructions stored in memories 606 and/or 608. Memories 606 and 608 can include various types of RAM (Random Access Memory), ROM (Read Only Memory), Flash memory, MEMS (Micro Electro-Mechanical Systems) memory, and the like. Network device 600 also includes one or more ports 604 (e.g., one or more hardware ports or other network interfaces that can be linked to other network devices, hosts, servers, storage devices, or the like). Port 604 includes timestamp engine 130. Port 604, including timestamp engine 130, can be implemented using one or more dedicated port ASICs. Processor 602, port 604, and memories 606 and 608 are coupled to send and receive data and control signals by one or more buses or other interconnects.

In this example, all or part of the functionality described with reference to FIGS. 3 and 4 may be implemented using a port ASIC 610. Program instructions executable to implement timestamp processing specified by a protocol (e.g., timestamp processing module 140) can be stored in memory 608. Various packets, including a protocol packet 614, can also be stored in memory 608. These packets can be stored in memory 608 prior to being sent on a network via port 604 and/or in response to being received from a network via port 604.

The program instructions and/or data executable to implement timestamp processing specified by a protocol can be stored on various computer readable storage media such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like). In order be executed, the software is loaded into memory from another computer readable storage medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present invention has been described with respect to specific embodiments thereof, various changes and modifications may be suggested to one skilled in the art. It is intended such changes and modifications fall within the scope of the appended claims.

What is claimed is:

1. A method comprising:
generating a first set of timing information;
inserting the first set of timing information into a first packet, wherein
the first packet complies with a first protocol;
appending an internal header to the first packet, wherein
the internal header identifies a second protocol,
the generating and the inserting of the first set of timing information is performed in response to the appending the internal header, and
the first set of timing information is inserted into the first packet at an offset specified in the internal header;
generating a second set of timing information;
inserting the second set of timing information into a second packet, wherein
the second packet complies with the second protocol, and
the generating and the inserting of the first set of timing information and the generating and the inserting of the second set of timing information are performed by a single timestamp engine; and
transmitting the first and second packets with the respective first and second sets of timing information from a network device onto a network, wherein the network device comprises the single timestamp engine.

2. The method of claim 1, further comprising:
inserting a respective set of timing information into each of a plurality of packets, wherein
each packet of the plurality of packets complies with a respective protocol of a plurality of protocols, and
the inserting the respective set of timing information is performed by the single timestamp engine.

3. A method comprising:
generating a first set of timing information;
inserting the first set of timing information into a first packet, wherein
the first packet complies with a first protocol;
detecting that the first packet requires a timestamp indicating a time at which the first packet is transmitted, wherein
the generating the first set of timing information is performed in response to the detecting that the first packet requires the timestamp, and
the first set of timing information comprises the timestamp;
generating a second set of timing information;
inserting the second set of timing information into a second packet, wherein
the second packet complies with a second protocol, and
the generating and the inserting of the first set of timing information and the generating and the inserting of the second set of timing information are performed by a single timestamp engine; and
transmitting the first and second packets with the respective first and second sets of timing information from a network device onto a network, wherein the network device comprises the single timestamp engine.

4. The method of claim 1, wherein
the first protocol comprises an operations, administration, and management (OAM) protocol, and
the second protocol comprises a clock synchronization protocol.

5. A method comprising:
receiving a first packet, wherein the first packet complies with a first protocol;
generating a set of timing information for the first packet; and
inserting the set of timing information into the first packet, wherein
the generating and the inserting is performed by a timestamp engine that complies with a second protocol.

6. The method of claim 5, wherein an internal header appended to the first packet identifies the second protocol.

7. The method of claim 5, further comprising:
detecting that the first packet requires a timestamp indicating a time at which the first packet is received on a port from a network, wherein
the generating is performed in response to the detecting, and
the set of timing information comprises the timestamp.

8. The method of claim 7, further comprising:
processing the timestamp according to the first protocol, subsequent to the inserting.

9. The method of claim 8, wherein the processing further comprises:
calculating delay in the network using the timestamp.

10. A network device comprising:
a timestamp engine configured to:
   generate a first set of timing information,
   insert the first set of timing information into a first packet, wherein
      the first packet complies with a first protocol,
   generate a second set of timing information,
   insert the second set of timing information into a second packet, wherein
      the second packet complies with a second protocol, and
      the generating and the inserting of the first set of timing information and the generating and the inserting of the second set of timing information are performed by the timestamp engine;
a port comprising the timestamp engine, wherein
   the port is configured to transmit the first and second packets with the respective first and second sets of timing information onto a network; and
a forwarding engine configured to append an internal header to the first packet, wherein
   the internal header identifies the second protocol,
   the first set of timing information is generated and inserted in response to the internal header, and
   the first set of timing information is inserted into the first packet at an offset specified in the internal header.

11. The network device of claim 10, wherein
the timestamp engine is further configured to
   insert a respective set of timing information into each of a plurality of packets, wherein
      each packet of the plurality of packets complies with a respective protocol of a plurality of protocols.

12. A network device comprising:
a timestamp engine configured to:
   generate a first set of timing information,
   insert the first set of timing information into a first packet, wherein
      the first packet complies with a first protocol,
   generate a second set of timing information,
   insert the second set of timing information into a second packet, wherein
      the second packet complies with a second protocol, and
      the generating and the inserting of the first set of timing information and the generating and the inserting of the second set of timing information are performed by a single timestamp engine;
a port comprising the timestamp engine, wherein
the port is configured to transmit the first and second packets with the respective first and second sets of timing information onto a network; and
a forwarding engine configured to
   detect that the first packet requires a timestamp indicating a time at which the first packet is transmitted, wherein
      the first set of timing information is generated in response to a detection that the first packet requires the timestamp, and
      the first set of timing information comprises the timestamp.

13. A network device comprising:
a port comprising a timestamp engine, wherein
   the port is coupled to a network,
   the port is configured to receive a plurality of packets, and
   the timestamp engine is configured to
      receive a first packet, wherein
         the first packet complies with a first protocol,
         the timestamp engine is configured to comply with a second protocol, and
         an internal header appended to the first packet identifies the second protocol,
      generate a set of timing information for the first packet, and
      insert the set of timing information into the first packet.

14. A network device comprising:
a port comprising a timestamp engine, wherein
   the port is coupled to a network,
   the port is configured to receive a plurality of packets, and
   the timestamp engine is configured to
      receive a first packet, wherein
         the first packet complies with a first protocol, and
         the timestamp engine is configured to comply with a second protocol,
      generate a set of timing information for the first packet, and
insert the set of timing information into the first packet; and
a forwarding engine configured to detect that the first packet requires a timestamp indicating a time at which the first packet is received on a port from a network, wherein
   the set of timing information is generated in response to a detection that the first packet requires the timestamp, and
   the set of timing information comprises the timestamp.

15. The network device of claim 14, further comprising:
a timestamp processing module configured to process the timestamp according to the first protocol, subsequent to insertion of the timestamp.

16. An apparatus comprising:
means for generating a first set of timing information;
means for inserting the first set of timing information into a first packet, wherein
   the first packet complies with a first protocol;
means for detecting that the first packet requires a timestamp indicating a time at which the first packet is transmitted, wherein
   the generating the first set of timing information is performed in response to the detecting that the first packet requires the timestamp, and
   the first set of timing information comprises the timestamp;
means for generating a second set of timing information;
means for inserting the second set of timing information into a second packet, wherein the second packet complies with a second protocol; and
means for transmitting the first and second packets with the respective first and second sets of timing information from the apparatus onto a network.

17. An apparatus comprising:
means for receiving a first packet from a network, wherein the first packet complies with a first protocol, and wherein an internal header appended to the first packet identifies the second protocol;
means for generating a set of timing information for the first packet; and
means for inserting the set of timing information into the first packet, wherein
   the means for inserting complies with a second protocol.

* * * * *

UNITED STATES PATENT AND TRADEMARK OFFICE
CERTIFICATE OF CORRECTION

PATENT NO. : 8,837,473 B2  
APPLICATION NO. : 13/270463  
DATED : September 16, 2014  
INVENTOR(S) : Stefano Binetti, Sreenivas Makam and Sandesh K. Rao Page 1 of 1

It is certified that error appears in the above-identified patent and that said Letters Patent is hereby corrected as shown below:

In the claims

Column 12  
Line 60, in Claim 17, replace: "the second protocol" by -- a second protocol --  
Line 65, in Claim 17, replace: "a second protocol" by -- the second protocol --

Signed and Sealed this  
Fifth Day of April, 2016

Michelle K. Lee  
*Director of the United States Patent and Trademark Office*